US009556789B2

(12) United States Patent
Geradts et al.

(10) Patent No.: US 9,556,789 B2
(45) Date of Patent: Jan. 31, 2017

(54) ASSEMBLY AND METHOD FOR SUPPLYING ELECTRICAL ENERGY TO ELECTRICAL TRACTION MOTORS IN A RAIL VEHICLE, IN PARTICULAR IN A TRAIN SET (75) Inventors: Karlheinz Geradts, Staufen AG (SE); Andreas Degenhardt, Hannoversch Munden (DE)

(73) Assignee: Bombardier Transportation GmbH, Berlin (DE)

( * ) Notice: Subject to any disclaimer, the term of this patent is extended or adjusted under 35 U.S.C. 154(b) by 833 days.

(21) Appl. No.: 14/001,044

(22) PCT Filed: Feb. 16, 2012

(86) PCT No.: PCT/EP2012/052705
§ 371 (c)(1),
(2), (4) Date: Aug. 22, 2013

(87) PCT Pub. No.: WO2012/113711
PCT Pub. Date: Aug. 30, 2012

(65) Prior Publication Data
US 2013/0333635 A1 Dec. 19, 2013

(30) Foreign Application Priority Data
Feb. 23, 2011 (DE) .......................... 10 2011 012 164

(51) Int. Cl.
*F01C 13/00* (2006.01)
*F01D 15/10* (2006.01)
(Continued)

(52) U.S. Cl.
CPC ................ *F02B 63/04* (2013.01); *B60L 1/003* (2013.01); *B60L 7/14* (2013.01); *B60L 9/30* (2013.01);
(Continued)

(58) Field of Classification Search
USPC 290/4 R, 31, 40 C, 52; 73/112.01; 180/65.1, 65.31; 310/171; 701/22
See application file for complete search history.

(56) References Cited

U.S. PATENT DOCUMENTS 4,008,423 A * 2/1977 Christianson ............. B60L 3/00
318/139
4,169,372 A * 10/1979 Colwill ..................... G01L 3/24
73/862.18
(Continued)

FOREIGN PATENT DOCUMENTS

DE 19523985 A1 1/1996
DE 10103538 B4 11/2007
(Continued)

*Primary Examiner* — Pedro J Cuevas
(74) *Attorney, Agent, or Firm* — The Webb Law Firm (57) ABSTRACT An assembly for supplying electrical energy to electrical traction motors in a rail vehicle, wherein the assembly includes at least one internal combustion engine, a generator allocated to the at least one internal combustion engine for generating the electrical energy, wherein the generator is mechanically coupled to the internal combustion engine such that it is driven by the internal combustion engine upon generator operation of the generator, a rectifier for rectifying an electrical alternating current generated by the generator, a direct voltage intermediate circuit that is electrically connected to the generator via the rectifier, a generator inverter that is present in addition to the rectifier or that is the rectifier operated in the inverter mode, wherein the generator inverter connects the direct voltage intermediate circuit to the generator in order to operate the generator in a motor mode as a motor, and a control for controlling the motor mode of the generator.

13 Claims, 4 Drawing Sheets (51) Int. Cl.
| | |
|---|---|
| *F02C 6/00* | (2006.01) |
| *F02D 25/00* | (2006.01) |
| *F02D 29/06* | (2006.01) |
| *H02P 9/04* | (2006.01) |
| *F02B 63/04* | (2006.01) |
| *B60L 7/14* | (2006.01) |
| *B60L 9/30* | (2006.01) |
| *B60L 11/18* | (2006.01) |
| *B60L 11/08* | (2006.01) |
| *B61C 5/00* | (2006.01) |
| *B60L 1/00* | (2006.01) |
| *H02K 17/42* | (2006.01) |
| *H02K 19/20* | (2006.01) |
| *B60K 1/00* | (2006.01) |
| *B60K 16/00* | (2006.01) |

(52) U.S. Cl.
CPC ........... *B60L 11/08* (2013.01); *B60L 11/1801* (2013.01); *B61C 5/00* (2013.01); *B60L 2200/26* (2013.01); *Y02T 10/646* (2013.01); *Y02T 10/70* (2013.01); *Y02T 10/7005* (2013.01); *Y02T 10/7077* (2013.01); *Y02T 30/10* (2013.01)

(56) References Cited

U.S. PATENT DOCUMENTS

| | | | | |
|---|---|---|---|---|
| 4,743,777 A * | 5/1988 | Shilling | F02N 11/04 | 290/31 |
| 4,850,193 A * | 7/1989 | Kawamura | F02B 37/10 | 60/608 |
| 5,635,804 A * | 6/1997 | Tanaka | B60L 11/1803 | 318/139 |
| 5,650,713 A | 7/1997 | Takeuchi et al. | | |
| 5,705,902 A * | 1/1998 | Merritt | H02K 1/2786 | 310/156.43 |
| 5,780,980 A * | 7/1998 | Naito | B60K 6/28 | 307/19 |
| 5,954,779 A | 9/1999 | Dietzel | | |
| 6,442,455 B1 * | 8/2002 | Kotre | B60K 6/445 | 123/179.16 |
| 6,806,687 B2 * | 10/2004 | Kajiura | F02N 11/04 | 290/40 A |
| 6,857,918 B1 * | 2/2005 | Lebreux | B63B 35/731 | 440/6 |
| 6,977,454 B2 * | 12/2005 | Hsu | H02K 16/00 | 310/114 |
| 7,005,822 B1 * | 2/2006 | O'Gorman | H02P 6/10 | 318/608 |
| 7,061,131 B2 * | 6/2006 | King | B60L 7/20 | 290/4 A |
| 7,134,180 B2 * | 11/2006 | Hsu | H02K 16/00 | 29/596 |
| 7,140,240 B2 * | 11/2006 | Gustafson | F01D 25/285 | 73/112.01 |
| 7,514,807 B2 * | 4/2009 | Donnelly | B60L 7/06 | 290/40 C |
| 7,541,687 B2 * | 6/2009 | Stahlhut | H02P 9/00 | 290/40 C |
| 7,733,039 B2 * | 6/2010 | Su | B60L 11/1811 | 180/65.1 |
| 7,781,904 B2 * | 8/2010 | Stahlhut | H02P 9/00 | 290/40 C |
| 7,940,018 B2 * | 5/2011 | Yonemori | B60K 6/46 | 180/65.1 |
| 8,109,353 B2 * | 2/2012 | Gurol | B60L 13/03 | 180/65.1 |
| 8,113,310 B2 * | 2/2012 | Gurol | B60L 5/005 | 104/283 |
| 8,378,510 B2 * | 2/2013 | Tanaka | F02N 11/04 | 290/31 |
| 8,583,309 B2 * | 11/2013 | Kaita | B60K 6/445 | 180/65.265 |
| 8,796,871 B2 * | 8/2014 | De Wergifosse | F02C 7/275 | 290/31 |
| 2002/0079149 A1 | 6/2002 | Kotre et al. | | |
| 2002/0101081 A1 | 8/2002 | Jockel | | |
| 2003/0144773 A1 * | 7/2003 | Sumitomo | B60K 6/442 | 701/22 |
| 2004/0251691 A1 | 12/2004 | King et al. | | |
| 2005/0206331 A1 * | 9/2005 | Donnelly | B60L 7/04 | 318/52 |
| 2005/0218738 A1 * | 10/2005 | Hsu | H02K 16/00 | 310/114 |
| 2005/0284214 A1 * | 12/2005 | Gustafson | F01D 25/285 | 73/112.01 |
| 2006/0028084 A1 * | 2/2006 | Hsu | H02K 16/00 | 310/171 |
| 2006/0061306 A1 * | 3/2006 | O'Gorman | H02P 6/10 | 318/105 |
| 2006/0266044 A1 | 11/2006 | Donnelly et al. | | |
| 2008/0190680 A1 * | 8/2008 | Kaneko | B60K 6/442 | 180/170 |
| 2008/0303289 A1 * | 12/2008 | Holliday | F02D 29/00 | 290/4 R |
| 2009/0286651 A1 * | 11/2009 | Tanaka | F02N 11/04 | 477/167 |
| 2010/0200316 A1 * | 8/2010 | Gurol | B60L 5/005 | 180/65.31 |
| 2010/0252340 A1 * | 10/2010 | Gurol | B60L 13/03 | 180/65.1 |
| 2011/0040434 A1 * | 2/2011 | Kishibata | B60K 6/48 | 701/22 |
| 2012/0211981 A1 * | 8/2012 | De Wergifosse | F02C 7/275 | 290/31 |
| 2012/0226406 A1 * | 9/2012 | Kaita | B60K 6/445 | 701/22 |
| 2014/0148984 A1 * | 5/2014 | Nishi | B60K 6/485 | 701/22 |
| 2015/0314687 A1 * | 11/2015 | Geradts | B60L 1/00 | 290/45 |
| 2015/0343910 A1 * | 12/2015 | Geradts | B60L 11/08 | 290/14 |

FOREIGN PATENT DOCUMENTS

| | | |
|---|---|---|
| DE | 102006033046 A1 | 1/2008 |
| DE | 102007060893 A1 | 6/2009 |
| EP | 0846590 A2 | 6/1998 |
| EP | 1849676 A2 | 10/2007 |

* cited by examiner

ASSEMBLY AND METHOD FOR SUPPLYING ELECTRICAL ENERGY TO ELECTRICAL TRACTION MOTORS IN A RAIL VEHICLE, IN PARTICULAR IN A TRAIN SET

CROSS-REFERENCE TO RELATED APPLICATIONS

This application is the United States national phase of International Application No. PCT/EP2012/052705 filed Feb. 16, 2012, and claims priority to German Patent Application No. 10 2011 012 164.1, filed on Feb. 23, 2011, the disclosures of which are hereby incorporated by reference in their entirety.

BACKGROUND OF THE INVENTION

Field of the Invention

The invention relates to an assembly and a method for supplying electrical energy to electrical traction motors in a rail vehicle, in particular a train set. The rail vehicle can in particular be a locomotive driven by a diesel-electrical drive unit or a rail vehicle that is part of a train set driven by a diesel-electrical drive unit.

Description of Related Art

Diesel-electrical drive units typically supply electrical energy to the traction motors and other consumers in the rail vehicle or train set by means of a generator, which is driven by the diesel engine and generates the electrical energy, wherein the generator is connected to a direct voltage intermediate circuit. Provision is made of at least one traction inverter for the traction motors and of at least one consumer inverter for the other consumers. The inverters generate alternating voltage or alternating current from the direct voltage of the intermediate circuit. However, it is also possible to connect DC traction motors and/or other DC consumers directly to the intermediate circuit without the interconnection of an inverter.

For the consumers, provision is made of a consumer connection that transfers the electrical energy from the consumer inverter or directly from the intermediate circuit to the consumer or consumers. The consumer connection can in particular be a connection comprising a so-called train current busbar. Hence the consumers are in particular ones that are employed for functions other than driving the rail vehicle or the train set such as heating, lighting, and/or air conditioning. For example, the assembly comprises the portion of a train current busbar that is arranged in the locomotive of a train set.

The invention relates in particular to assemblies or methods that have been described previously.

DE 101 03 538 B4 describes an electric motor-driven rail vehicle with an internal combustion engine. In normal operation (traction of the rail vehicle), a generator/motor system supplies a 3-phase alternating voltage to a pulse rectifier that feeds a direct voltage intermediate circuit. The direct voltage intermediate circuit can feed a DC motor or one or more three-phase drive motors via an inverter. The internal combustion engine and the generator, which can be a synchronous machine with either permanent magnet excitation or separate excitation or an asynchronous machine, are mechanically coupled to one another. Upon braking the electric motor-powered rail vehicle, the generator/motor system works in motorized operation and braking energy is thus introduced into the internal combustion engine.

Braking energy, which is supplied to the internal combustion engine, brings about an increase in the kinetic energy, i.e., the speed, and is also partially dissipated as heat. The internal combustion engine, especially when it is already running at high or medium speed right before braking, can only absorb a little braking energy. This is also true if the braking process is more protracted. The amount of continuous braking power that can be introduced into the internal combustion engine is small.

SUMMARY OF THE INVENTION

An object of the present invention is to propose an assembly and a method for supplying electrical energy to electrical traction motors in a rail vehicle that enable an energy-efficient operation of said rail vehicle.

According to a fundamental idea of the present invention, upon braking the generator mechanically coupled to the internal combustion engine drives the internal combustion engine, i.e., the generator is operated as a motor. The internal combustion engine then runs at an idle speed. Hence the generator does not introduce maximum braking energy into the internal combustion engine, but instead the internal combustion engine is simply prevented from stopping so that it does not require laborious restarting upon demand for traction. When idling the internal combustion engine needs little fuel, but has a low efficiency. Preference is given to cutting off the fuel supply to fuel combustion chambers of the internal combustion engine when the latter is driven by the generator in the motorized mode of the generator. This can be effected via a central control of the assembly, which controls more than just the internal combustion engine, or via a separate engine control.

An idle speed is understood to mean a speed of the internal combustion engine at which generally no traction of the rail vehicle is effected, even if the generator is generating electrical energy and feeding it into the direct voltage intermediate circuit. At idle speed, electrical energy is generated by the generator at an output that at most covers the energy needs of the other consumers that are not directly employed in traction. For internal combustion engines, an idle speed or a range of idle speeds is usually specified by the engine manufacturer. According to the present invention, this specified idle speed or this specified range of idle speeds in particular can also be specified for the motorized operation of the generator. However, it is also conceivable to specify an idle speed or range of idle speeds that differs from the engine manufacturer's specification, in particular for lower speed values. When the generator drives the internal combustion engine, the latter is not operated under a load. It is only necessary to ensure that the internal combustion engine does come to a standstill. This is usually ensured by the generator operating in the motorized mode even if a low idle speed is selected.

An internal combustion engine driven by the generator at idle speed has the advantage that the internal combustion engine is subjected to little mechanical wear. The cooling systems of the internal combustion engine are also not needed or only subjected to a light load. Fuel consumption is very low or zero.

The invention is also suitable for assemblies with more than one internal combustion engine, wherein, for example, a generator is coupled to each of the internal combustion engines, which is driven upon traction operation by the internal combustion engine in order to generate electrical energy, and which upon motorized operation of the generator drives the allocated internal combustion engine. Motorized operation of the generator can take place if the vehicle is braked or if the assembly of several internal combustion engines is only operated under a partial load such that only a portion of the internal combustion engines has to generate mechanical energy. The other internal combustion engines can be driven at idle speed by the allocated generator.

In particular the following is proposed: an assembly for supplying electrical energy to electrical traction motors in a rail vehicle, in particular in a train set, wherein the assembly comprises:

at least one internal combustion engine, a generator allocated to the at least one internal combustion engine in order to generate electrical energy, wherein the generator is mechanically coupled to the internal combustion engine such that upon generator operation of the generator it is driven by the internal combustion engine (in particular upon traction operation of the at least one traction motor), a rectifier for rectifying an alternating electric current generated by the generator, a direct voltage intermediate circuit, which is electrically connected to the generator via the rectifier, a generator inverter, which is present in addition to the rectifier or is the rectifier operated in the inverter mode, wherein the generator inverter is connected to the generator via the direct voltage intermediate circuit in order to run the generator in a motorized mode as a motor, a control for controlling the motorized operation of the generator, wherein the control has a signal input for receiving a signal which signals that no drive power is demanded from the internal combustion engine, wherein an idle speed or a range of idle speeds of the internal combustion engine is specified and the control is configured, upon receipt of the signal, to control the motorized operation of the generator such that the internal combustion engine is driven by the generator at the specified idle speed or at an idle speed in the range of specified idle speeds, wherein the generator is supplied with electrical energy from the direct voltage intermediate circuit via the inverter.

The following is furthermore proposed: a method for supplying electrical energy to electrical traction motors in a rail vehicle, in particular in a train set, wherein:

at least one internal combustion engine operating in a generator mode drives a generator allocated to the internal combustion engine, the generator generates electrical energy, the generated electrical energy is rectified and fed into a direct voltage intermediate circuit from which the at least one traction motor is supplied with traction energy, in a motorized mode of the generator, the generator acquires electrical energy from the direct voltage intermediate circuit and drives the internal combustion engine, in the motorized mode of the generator upon reception of a signal which signals that no drive power is demanded from the internal combustion engine, the generator is controlled such that the internal combustion engine is driven by the generator at a specified idle speed or at an idle speed in a specified range of idle speeds.

The signal which signals that no drive power is demanded from the internal combustion engine can be generated in particular by a drive and/or brake control of the rail vehicle. The signal is in particular generated when the driver of the rail vehicle does not demand any traction (e.g., a corresponding control lever of the driver is in neutral) and/or if a speed regulator detects no need for traction, for example because the speed selected by the driver has been reached and can be maintained without traction (e.g., on a downhill stretch where the vehicle is in the so-called coasting mode). The signal can also be generated if a central control of the assembly does not need one of several internal combustion engines of the rail vehicle for traction, e.g., in partial load operation.

The control for controlling the motorized mode of the generator (henceforth the generator control) receives the aforementioned signal. The generator control controls the generator in such a way that it drives the internal combustion engine at the idle speed of the internal combustion engine. The control can in particular specify and/or set the frequency of the alternating current with which the generator is operated in its motorized mode. Preference is given to controlling the generator at the start of motorized operation such that the motorized operation starts in a jolt-free manner. In particular an angular position encoder can be combined with the generator, with the mechanical coupling, and/or with the internal combustion engine, which enables the current pole wheel position of the generator, of the mechanical coupling, and/or of the internal combustion engine to be determined. In this case the alternating current with which the generator is supplied at the start of motorized operation is preferably generated such that a jolt at the start of motorized operation is avoided. In this sense the alternating current is thus generated in a phase-correct or "phase and frequency synchronous" manner.

The assembly in particular comprises a plurality of internal combustion engines, wherein an allocated generator is coupled to each internal combustion engine, which generator is driven in a generator mode by the internal combustion engine in order to generate electrical energy, and which drives the allocated internal combustion engine in a motorized mode of the generator, wherein the assembly is configured, to operate a portion of the generators in the motorized mode of the generator when the assembly of several internal combustion engines is only operated in the partial load mode such that only a portion of the internal combustion engines generates mechanical energy and the other internal combustion engines are driven at idle speed by the allocated generator, and/or upon braking the vehicle, to operate the generators in the motorized mode of the generator such that the internal combustion engines are driven at idle speed by the allocated generator.

According to the method, a plurality of internal combustion engines is driven, wherein an allocated generator is coupled to each engine, which generator is driven in generator operation by the internal combustion engine in order to generate electrical energy, and which in a motorized mode of the generator drives the allocated internal combustion engine, wherein a portion of the generators is operated in the motorized mode of the generator when the assembly of several internal combustion engines is only operated in the partial load mode such that only a portion of the internal combustion engines generates mechanical energy and the other internal combustion engines are driven at idle speed by the allocated generator, and/or upon braking the rail vehicle, the generators are operated in the motorized mode of the generator such that the internal combustion engines are driven at idle speed by the allocated generator.

A partial load mode of the assembly is understood to mean in particular an operation mode in which the mechanical power of only a portion of the internal combustion engines is sufficient for providing the required electrical power, in particular the traction power, and optionally additional necessary power (e.g., for auxiliary systems) in the rail vehicle.

The advantages of operating only a portion of the generators in the generator mode and the other portion in the motorized mode are a lower noise level and a reduced need of fuel for the internal combustion engines. In particular, the fuel supply for each of the internal combustion engines driven at idle speed by the allocated generator in the motorized mode thereof is cut off. Besides the aforementioned auxiliary systems, other consumers of electrical energy can also be supplied by the generators or from the direct voltage intermediate circuit. Losses of electrical energy can also be taken into account in the question of whether a partial load operation is taking place or should take place. In particular several different power levels can exist in the partial load mode. A certain number of internal combustion engines with the allocated generator in each case is allocated to each power level. In the lowest power level of the partial load mode, only one generator is operated in the generator mode, i.e., driven by the allocated internal combustion engine. In the next higher power level, two generators are operated in the generator mode, and so forth. Accordingly, in the partial load mode there are as many power levels with different numbers of generators to operate as there are internal combustion engines, minus 1. Operation of all generators in the generator mode is referred to as full-load rather than partial load operation, even if not all internal combustion engines are operating at maximum power.

The power levels for the partial load mode are preferably specified such that the internal combustion engines operated under a load (i.e., the allocated generators are run in the generator mode) are operated within a specified speed range with optimum efficiency. In particular, all internal combustion engines can then be operated under a load if the same mechanical output or electrical output is achievable by the load operation of fewer than all internal combustion engines. This operation of fewer than all internal combustion engines, however, would take place in a range of speeds in which the efficiency of the respective internal combustion engine is low.

If the rail vehicle is braked, all internal combustion engines are preferably driven at idle speed by the allocated generator such that in particular it will be or is possible to cut off the fuel supply to all internal combustion engines.

In particular a characteristics line can be specified for the operation of several internal combustion engines, wherein the characteristics line defines the relationship of all internal combustion engines simultaneously operated under a load to the average speed of the internal combustion engines operated under a load. Average speed is understood to mean the speed of the internal combustion engines operated under a load that is given by calculating the arithmetic mean of the internal combustion engines operated under a load. Under certain operating conditions (e.g., rapid acceleration of the rail vehicle, restriction of the total sound level generated by the internal combustion engines and allocated generators and mechanical couplings, and/or high power need for the acquisition of electrical energy power from the direct voltage intermediate circuit for purposes other than traction), the control of the internal combustion engines and generators can deviate from the specified operating characteristics line. For example, a deviant operating characteristics line can then be specified and used by the control.

In particular an operating characteristics line is specified that corresponds to the above-mentioned power levels for partial load operation and also to full-load operation. In the lowest power level, when only one of the internal combustion engines is operated under a load, according to the operating characteristics line the power generated by the one internal combustion engine increases continuously with the speed of the internal combustion engine until a first threshold, specified according to the operation characteristics line, of the power demanded (for example, by the driver or a driver assistance system) is reached. Upon reaching or exceeding the threshold, a second internal combustion and the allocated generator are driven such that said second internal combustion is also operated under a load such that the second allocated generator also generates electrical energy. During a startup phase of the joint operation of the two internal combustion engines under a load, the speed of both internal combustion engines is preferably adjusted over time to the same speed value.

With further increasing demanded power, the average speed of the internal combustion engines operated under a load is increased until a second threshold of the demanded speed is reached (provided that at least one other internal combustion engine not operating under a load is still present). Upon reaching or exceeding this second threshold, the operation of third internal combustion engine simultaneously with the other two internal combustion engines is initiated. Here too there can be a transitional phase started with the beginning of operation in which the speeds of the three internal combustion engines are adjusted to the same value, i.e., the average value. With a further increase of the demanded power, this process continues accordingly and one or more additional internal combustion engines, if present, are switched in succession to the load mode.

Expressed more generally, the several internal combustion engines with the allocated generators are thus operated such that upon reaching or exceeding a specified threshold of the demanded power (or equivalent quantity), the operation of another internal combustion engine that was previously not in load operation and hence the allocated generator was operated in the motorized mode, will be operated in the power mode (i.e., the internal combustion engine generates mechanical power), i.e., upon reaching or exceeding the threshold the allocated generator will be operated in the generator mode.

Upon reduction of the demanded power over time, an internal combustion engine is preferably not switched from the load mode back to the idle mode, i.e., the allocated generator is not switched to motorized operation, at the same threshold as for increasing demanded power, but instead another threshold is/will be specified that is lower than the threshold for increasing power demand. Upon reaching or falling short of the other threshold, one of the internal combustion engines will be switched to the idle mode, i.e., the generator will be switched to the motorized mode. Through this hysteresis of the operating characteristics line, a frequent switching between the motorized and generator modes of a generator and/or between the idle and power modes of the allocated internal combustion engine in response to power demands fluctuating about the threshold will be avoided.

The electrical energy for supplying the generator in its motorized mode is drawn from the direct voltage intermediate circuit. Hence an inverter, via which the direct voltage intermediate circuit is connected to the generator, is preferably operated such that it generates the desired alternating current. Standard pulse inverters for electrical systems in rail vehicles, for example, are suitable.

The generator control can in particular operate the generator in the motorized mode when the rail vehicle is coasting without a demand for traction by the driver and without a demand for braking by the driver.

In particular when the assembly comprises, in addition to at least one traction motor, consumers that are supplied with electrical energy from the direct voltage intermediate circuit, the control is preferably configured to operate the generator as described above in the motorized mode, wherein the control is configured to operate at least one traction motor in a generator mode so that the energy needed from the direct voltage intermediate circuit by the consumers is at least partially fed into the direct voltage intermediate circuit by the at least one traction motor if a specified criterion is fulfilled that corresponds to an insufficient state of charge of the direct voltage intermediate circuit with any energy storage unit connected thereto.

With regard to the method, if electrical energy from the direct voltage intermediate circuit is supplied to electrical consumers that are present in addition to the at least one traction motor, if the generator is operated in the motorized mode, and if a specified criterion is fulfilled that corresponds to an insufficient state of charge of the direct voltage intermediate circuit with any energy storage unit connected thereto, it is therefore preferred that the at least one traction motor is operated in a generator mode so that the energy from the direct voltage intermediate circuit needed by the consumers is at least partially fed into the direct voltage intermediate circuit by the at least one traction motor.

This makes it possible to continue the motorized operation of the generator and save more fuel, since the additional electrical consumers are operated with recycled electrical energy (braking energy). Obviously preference is given to the connection of at least one storage unit for storing electrical energy (e.g., a battery of super capacitors) to the direct voltage intermediate circuit. However, standard smoothing capacitors for smoothing the direct voltage in the intermediate circuit also absorb electrical energy.

The specified criterion, the fulfillment of which leads to the infeeding of braking energy, can be, for example, insufficient direct voltage in the direct voltage intermediate circuit. To this end, for example, the direct voltage between the two potentials of the direct voltage intermediate circuit is measured and continuously monitored to determine if it falls below a specified minimum voltage. Such monitoring is easily implemented and has the advantage that the voltage is generally also needed to operate inverters that are connected to the direct voltage intermediate circuit. As an alternative, however, the state of charge or final state of charge of one of the energy storage units connected to the intermediate circuit can be monitored and the infeeding of braking energy can be initiated if the charge drops below a specified minimum state of charge.

The infeeding of braking energy to cover the need of electrical consumers (with the exception of traction motors) can in particular take place while the vehicle is coasting or in the coasting mode (i.e., on a downhill stretch). If a speed regulator is present that attempts to keep the travel speed of the vehicle constant, if the vehicle driver or a vehicle control system specifies a constant travel speed, but if the stretch is not a downhill stretch, the specified criterion will be fulfilled quickly since the energy stored in the intermediate circuit and in any storage devices connected thereto will be used up within a relatively short time. However, this in turn leads to the internal combustion engine or to at least one of the internal combustion engines (if several are present) operating under a load in order to drive the allocated generator. Hence the speed regulator is preferably configured to permit a decrease of travel speed in spite of a temporally constant speed specification (i.e., a constant target speed). To this end, an instruction is specified according to which the decrease of travel speed can take place.

If the vehicle travel speed is set by a speed regulator that regulates the vehicle travel speed corresponding to a speed specification (e.g., of the driver) as a function of said speed specification by operating the at least one traction motor as needed in either the generating or the motorized mode, it is therefore proposed to configure the speed regulator such that a decrease of the travel speed according to a specified instruction is permitted in spite of a temporally constant speed specification. Furthermore, an assembly is proposed in which the control comprises or is connected to a speed regulator, wherein said speed regulator is configured to regulate the travel speed corresponding to a speed specification as a function of said speed specification by operating the at least one traction motor as needed in either the generator or motorized mode, and wherein the speed regulator is configured to permit a decrease of the travel speed according to a specified instruction in spite of a temporally constant speed specification.

As an instruction, for example, it can be stipulated that the travel speed per time interval (e.g., 1 minute) may decrease by a specified maximum amount and/or that the travel speed may lie below the target travel speed by at most a (second) specified amount. The second specified amount is, e.g., 0.5 km/h. Because the mass of the train set, especially a rail vehicle train set, is considerable and the energy needed to operate the additional consumers at typical travel speeds of at least 30 or 40 km/h is therefore quite small compared to the braking energy, which, for example, must be drawn over a time span of a few minutes, even with a very small speed decrease sufficient braking energy can be fed into the intermediate circuit to cover the energy need of the other consumers.

The control was also designated as a generator control above. However, mention was also made of the control in connection with the infeeding of braking energy by the generator operation of at least one traction motor. These controls can either be the same control or provision can be made of separate controls for the generator and the infeeding of braking energy. In the last mentioned case, preference is given to the controls being signal connected to one another or to the presence of a master control, which is connected to both controls. In this manner, for example, the information that the motorized operation of the generator has started, the motorized operation of the generator has stopped, the motorized operation of the generator must be stopped, and/or the generator operation of at least one traction motor has started can thus be exchanged and/or at least transmitted to one of the controls. In particular a single, common control or a master control can determine an operating mode of the assembly from the corresponding information which enables better fuel economy. For example, the motorized operation of the generator would need to be stopped upon fulfillment of the above-mentioned criterion, according to which the state of charge of the direct voltage intermediate circuit is no longer sufficient. But if the signal is received that the generator operation of the traction motor has begun and therefore braking energy is being infed, the motorized operation of the generator can be continued.

As mentioned, the control or a separate motor control of the internal combustion engine can be configured to cut off a fuel supply to fuel combustion chambers of the internal combustion engine when the internal combustion engine is driven by the generator operating in the motorized mode of the generator. In this case the control or the separate engine control of the internal combustion engine can be configured to resume the fuel supply to the fuel combustion chambers if a second specified speed above the specified idle speed or above the range of specified idle speeds is reached.

In particular the control or separate motor control can thus react to, e.g., a measured value of the speed and the generator control can trigger the load operation of the internal combustion engine by increasing the speed of the generator in the motorized mode. In order to prevent the internal combustion engine from stopping and having to be laboriously restarted, the fuel supply is resumed so that the internal combustion engine can idle under its own power.

BRIEF DESCRIPTION OF THE DRAWINGS

Exemplary embodiments of the invention will now be described with reference to the appended drawing. Schematically shown in the individual figures of the drawing are.

DESCRIPTION OF THE INVENTION

Figure 1:
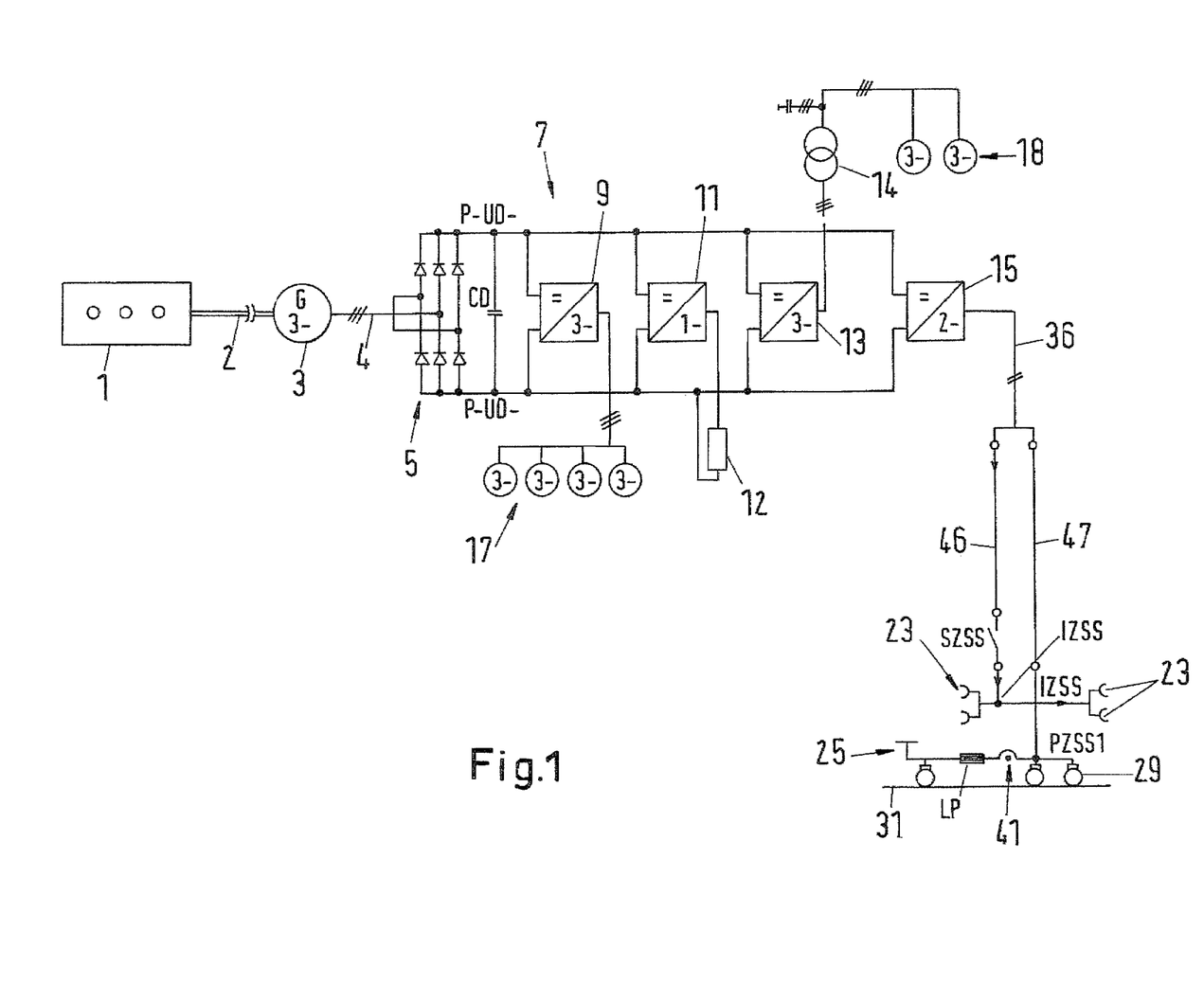
FIG. 1 an assembly for supplying electrical energy to traction motors and consumers in a rail vehicle, in which a single internal combustion engine-generator combination is illustrated, FIG. 2 an assembly for supplying electrical energy to at least one traction motor and additional electrical consumers in a rail vehicle, in which provision is made of a plurality of internal combustion engine-generator combinations, FIG. 3 a control and regulation structure for controlling the operation of a generator and a traction motor, and FIG. 4 an operation characteristics line for an assembly with at least two internal combustion engines, wherein a generator is allocated to each engine.

According to FIG. 1, a diesel engine 1 drives a generator 3 via a mechanical coupling 2 (e.g., driveshaft with clutch), which generator generates a three-phase alternating current that is rectified via a rectifier 5. The rectifier 5 is connected to a direct voltage intermediate circuit 7. The potentials of the direct voltage intermediate circuit 7 are designated with P-UD+ (top side of the intermediate circuit 7 illustrated in FIG. 1) and with P-UD− (bottom side of the intermediate circuit 7 illustrated in FIG. 1).

A traction inverter 9 that supplies four drive motors 17 of the rail vehicle via a three-phase connection, a braking chopper 11 to which at least one braking resistor 12 is connected, an auxiliary system inverter 13 that supplies auxiliary systems 18 (i.e., additional electrical consumers) via a three-phase alternating current cable, and a consumer inverter 15 that supplies electrical energy to other additional electrical consumers via a single-phase consumer connection 36 (with cables 46, 47), are connected to the intermediate circuit 7.

Furthermore, in standard fashion capacitors CD are interconnected between the potentials P-UD+ and P-DU− of the intermediate circuit 7. In another configuration, the consumer inverter 15 can supply electrical energy to the consumers via a three-phase alternating voltage consumer connection.

The auxiliary system inverter 13 illustrated in FIG. 1 is connected to the auxiliary systems 18 via an isolation transformer 14, which effects a galvanic isolation. Furthermore, provision can also be made of an isolation transformer in the consumer connection 36 in order to ensure a galvanic isolation between the consumer inverter 15 and the consumers. In the case shown, however, the consumer inverter 15 is connected without galvanic isolation to the train busbar IZSS, which in turn has terminals 23 for connecting the additional electrical consumers.

The train current busbar IZSS has only one cable. The second electric potential, which is needed to transfer energy from the consumer inverter 15 to the consumers, is created via vehicle mass/track 31. The alternating voltage consumer connection 36 has two cables 46, 47. The cable 46 is connected via the switch SZSS to the train current busbar IZSS. The other cable 47 is connected to the track via the junction point PZSS1, via wheel-ground contacts and wheels of the rail vehicle, and to the vehicle mass at the point designated with the reference sign 25 via an inductor LP or a low ohm resistor. A current sensor 41 is connected in series to the inductor LP.

Figure 2:
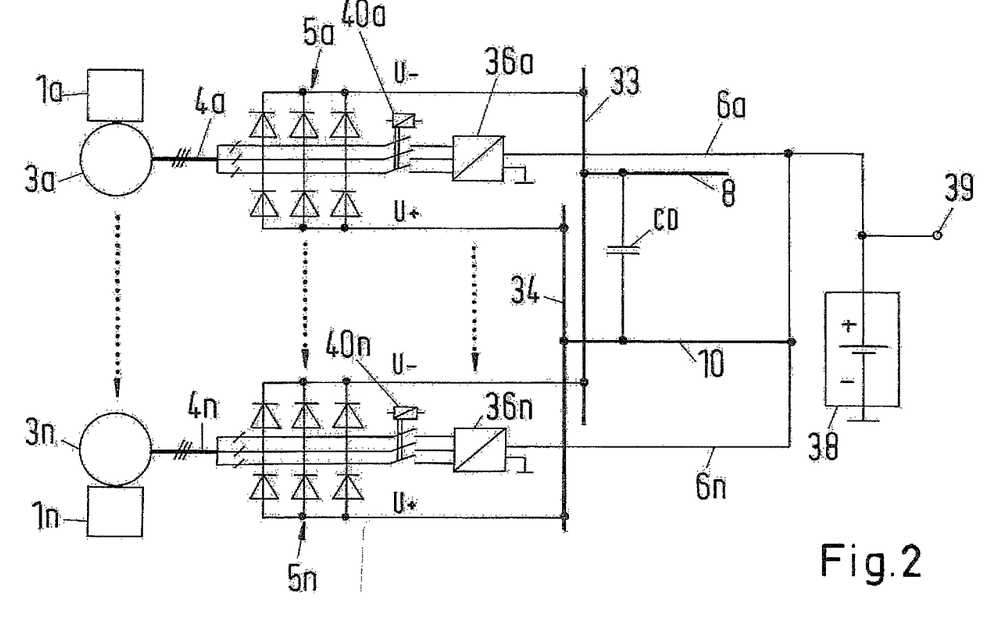

FIG. 2 shows an assembly that in particular can be configured as in FIG. 1. However, only a portion of the assembly is drawn, in which details of individual components of the assembly are illustrated. The same reference signs, in particular the same numbers, designate the same or corresponding components as in FIG. 1.

In the assembly there are n combinations with an internal combustion engine $1a \ldots 1n$ and a generator $3a \ldots 3n$ mechanically coupled thereto in each case, wherein n is a positive whole number. In actual practice, for example, there are four such combinations in a locomotive.

Each of the combinations 1, 3 is connected to a rectifier $5a \ldots 5n$ via a three-phase power supply cable $4a \ldots 4n$. In the exemplary embodiment, the rectifiers 5 are uncontrolled three-phase bridge circuits. The different potentials on the direct voltage side of the rectifiers 5 are designated with U+ or U−. The rectifiers 5 are connected to the cables 8, 10 on the direct voltage intermediate circuit via connecting cables 33, 34, which are configured as buses for all rectifiers 5.

As an alternative, provision could be made of several direct voltage intermediate circuits, from each of which electrical energy is supplied to at least one traction motor.

In the exemplary embodiment, one of the potentials, specifically the higher potential U+ of the intermediate circuit, is in each case electrically connected via another connecting cable $6a \ldots 6n$ to a generator inverter $36a \ldots 36n$ of the respective motor-generator combination 1, 3. The other potential of the intermediate circuit is, for example, connected to the vehicle mass. Furthermore, in the exemplary embodiment a vehicle energy storage unit 38 for storing electrical energy is connected, e.g., via a DC/DC converter (not shown), to the cable 10 of the intermediate circuit. The energy storage unit and/or the intermediate circuit can also be charged via a terminal 39, for example via a so-called battery charger, which can also be the DC/DC converter.

The generator inverters 36 are connected to the three-phase cable $4a \ldots 4n$ via a three-phase cable and an isolation contactor $40a \ldots 40n$.

In an alternative embodiment, in lieu of the uncontrolled rectifier bridge and the generator inverter provision can be made of a converter, which can be operated as both a rectifier (with the generator running in the generator mode) and as an inverter (with the generator running in the motorized mode). The embodiment illustrated in FIG. 2 with a separate rectifier bridge and generator inverter has the advantage that the generator inverter can be designed to transmit lower electrical voltages and outputs than the rectifier bridge, since only small outputs are needed to run the motor at idle speeds when the generator is running in the motorized mode. A controlled or regulated integrated converter for both rectification and inversion, however, would have to be designed for heavy duty outputs in the traction mode.

The assembly illustrated in FIG. 1 can also comprise a generator inverter in addition to the illustrated rectifier 5, as shown in FIG. 2. This inverter can be connected on its direct voltage side to the two potentials of the direct voltage intermediate circuit 7. In lieu of the rectifier 5 and this generator inverter, provision can also be made of a converter for both rectification and inversion.

In order that no traction energy has to be generated by the internal combustion engine 1, the generator 3 is operated in the motorized mode and drives the internal combustion engine 1 at idle speed. The fuel supply to the internal combustion engine 1 is then preferably cut off. As soon as traction energy is needed from the internal combustion engine 1 again, the internal combustion engine 1, via the mechanical coupling 2, again drives the generator 3, which in turn generates electrical energy and feeds it into the direct voltage intermediate circuit 7 via the rectifier 5 or a converter.

If the consumers 18 and/or the consumers connected to the terminals 23 need electrical energy during the motorized operation of the generator 3, this electrical energy can initially be drawn from the direct voltage intermediate circuit 7 and any energy storage units connected thereto (such as the capacitor CD or the vehicle energy storage unit 38). However, if the stored energy is no longer sufficient, and if neither traction nor braking are demanded by the driver or the vehicle systems, preference is then given to operating at least one of the traction motors as a generator such that the electrical energy thus generated is fed into the direct voltage intermediate circuit 7.

Also when braking the rail vehicle, the generator 3 is preferably operated in the motorized mode and drives the internal combustion engine 1 at idle speed. Again preference is given to cutting off the fuel supply to the engine 1. At low speeds in particular, the kinetic energy and hence also the electrical energy generated by traction motors declines as the travel speed continues to diminish. Depending on the storage capacity of the storage units connected to the intermediate circuit, at low travel speed or shortly after the vehicle comes to a standstill or even some time after standstill, for the continued operation of the consumers 18 and/or of the consumers connected to the terminals 23 it may be necessary to generate electrical energy and feed it into the intermediate circuit 7 by running the generator 3 in the generator mode (i.e., driven by the internal combustion engine 1). To this end, the fuel supply to the engine 1 is turned back on. In the case of the exemplary embodiment of FIG. 2, the isolation contact 40a . . . 40n is opened so that the generator inverter 36a . . . 36n is no longer connected to the generator 3a . . . 3n, as is the case during the motorized operation of the generator.

If there are several motor-generator combinations 1, 3 available, as in the exemplary embodiment of FIG. 2, when the rail vehicle is at a standstill preference is given to operating only one of the combinations 1, 3 in order to feed electrical energy into the direct voltage intermediate circuit.

If upon braking the rail vehicle the traction motors 17 feed more energy into the intermediate circuit 7 than is being drawn from it and can be stored, electrical energy is then fed via the braking chopper 11 to the braking resistors 12 and converted to heat. In standard fashion there is also a mechanical brake available.

To start the internal combustion engine 1, the isolation contact 40 is preferably closed and electrical energy from the energy storage unit 38 is supplied to the generator 3 via the generator inverter 36 (or via another converter) so that the generator in motorized operation starts the internal combustion engine 1. In the case of starting a diesel engine, for example, the speed of the generator 3 is increased over time until the engine has reached a speed of, e.g., 400 rpm. The engine can then reach the idle speed of, e.g., 600 rpm, under its own power. Similar to the jolt-free operation at the beginning of the motorized mode of the generator as described above, with the internal combustion engine running the rotation angle position of the generator, the mechanical coupling, and/or the engine can be measured and factored in during the starting process such that, for example, the frequency and phase of the current generated by the generator inverter can be set.

The generator can be, e.g., a synchronous machine with permanent magnet excitation. However, use can also be made of asynchronous machines.

Figure 3:
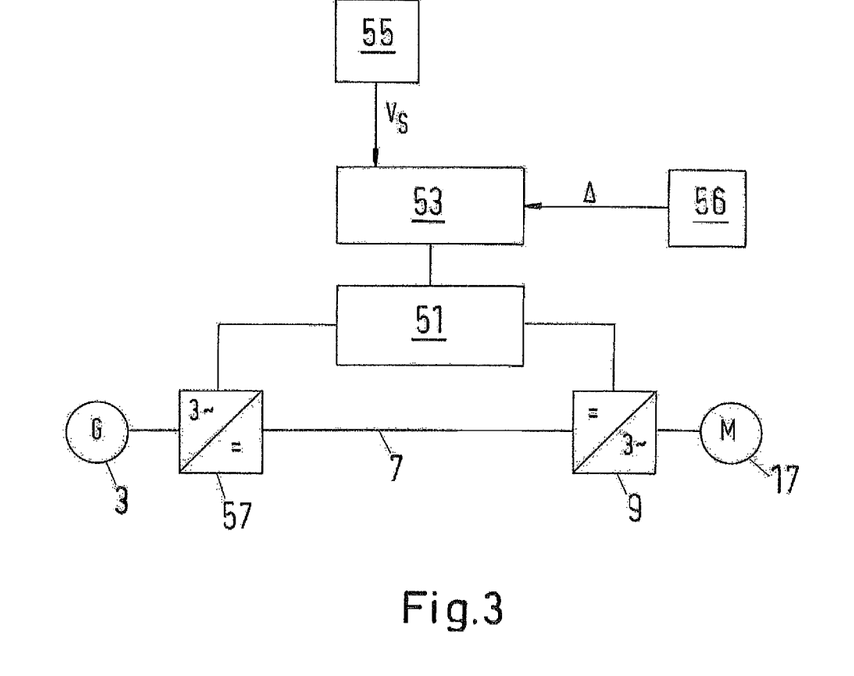

FIG. 3 schematically shows a control/regulation assembly. The same components and components having the same functions as in FIGS. 1 and 2 are designated with the same reference signs. Compared to the assemblies in FIG. 1 and FIG. 2, however, some components of the assembly have been left out.

In contrast to FIG. 1 and FIG. 2, the generator 3 in the exemplary embodiment of FIG. 3 is connected to the direct voltage intermediate circuit 7 via a converter 57, wherein the converter functions both as a rectifier in the generator mode of the generator 3 and as an inverter in the motorized mode of the generator 3. This converter 57 and the traction inverter 9 are controlled by a control 51, which, for example, sets the switching times for the on- and off-switching of the semiconductor switches of the converters 9, 57 and emits appropriate signals. However, the control 51 can also be a master control such that controls also not illustrated in FIG. 3 are present, which are individually allocated to the converters 9, 57.

The control 51 is connected to a regulator 53, which in turn receives the vehicle speed target value $v_s$ from a device 55. From a unit 56, the regulator 53 also receives information on how the travel speed can decrease even though the target speed $v_s$ has remained constant. This information is designated by $\Delta$. For example, according to the information $\Delta$, the travel speed can decrease to a specified value below the currently valid target speed $v_s$, wherein the difference lies in the range of, e.g., 0.3 to 1 km/h. This information $\Delta$ applies to the operation phase in which neither traction nor braking is demanded from the drive motors 17. As described above, however, a braking can still take place with very little braking force in such an operation phase because at least one of the traction motors 17 is operated as a generator and thus feeds electrical energy into the direct voltage intermediate circuit 7.

Figure 4:
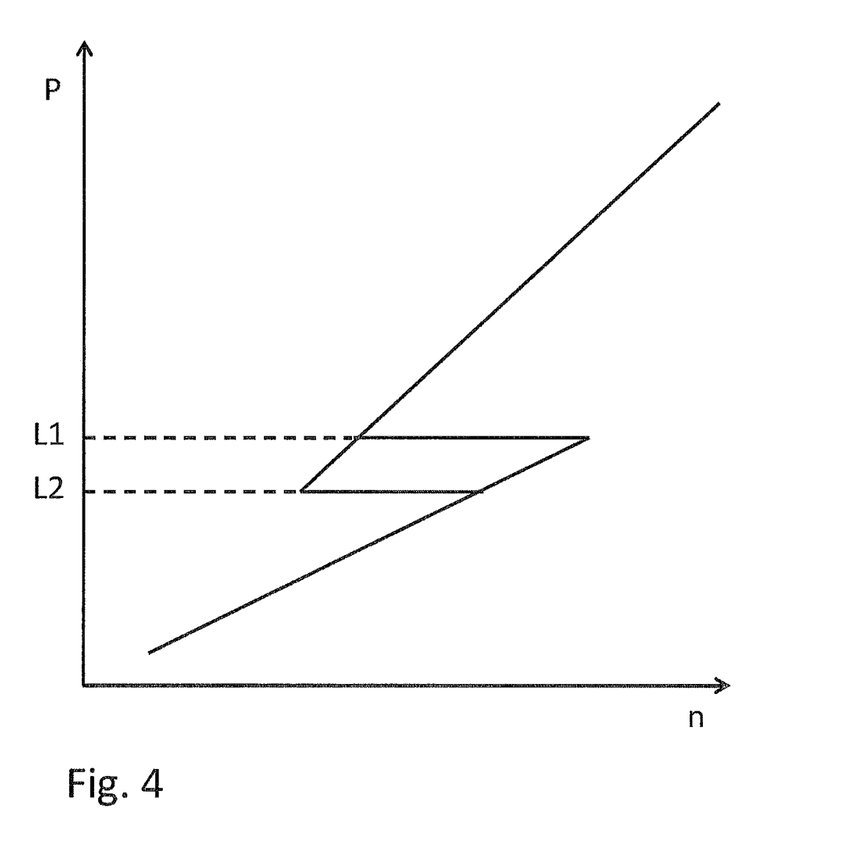

FIG. 4 shows a graph with an operation characteristics line, wherein the average speed n of the internal combustion engines operated under a load is plotted on the horizontal axis (x-axis) of the coordinate system and the demanded power P is plotted along the vertical axis (y-axis) of the coordinate system. Assuming small values for the speed and demanded power, the power initially increases linearly with the speed until a threshold is reached at a power level L1. Upon reaching or exceeding the threshold, another internal combustion engine is started in power operation or load operation and the allocated generator is thus started in generator operation. Previously this generator had been in motorized operation and driving the allocated internal combustion engine at idle speed. With further increasing demand for power, the output of both internal combustion engines or of all internal combustion engines in the load mode increases further. If the demanded power decreases below the level L1 of demanded power, at first no internal combustion engine operating under a load is switched to the idle mode, i.e., the allocated generator is still operated in the generator mode and driven by the internal combustion engine. Upon reaching or dropping below the power level L2, which is lower than the power level L1, then one of the internal combustion engines operating under a load is switched to the idle mode, i.e., the allocated generator is then switched to the motorized mode, in which it drives the allocated internal combustion engine at the idle speed.

In particular the two ascending lines in FIG. 4 run at an acute angle rather than parallel to one another, wherein their linear extensions would intersect at a non-designated point on the graph (e.g., at or near the point of intersection of the two coordinate axes), where the average speed n would deliver the demanded power P=0. The same applies to cases in which there are more than two ascending lines, in other words two or more internal combustion engines can be switched between the motorized mode and the generator mode.

The invention claimed is:

1. An assembly for supplying electrical energy to electrical traction motors in a rail vehicle, wherein the assembly comprises:
   at least one internal combustion engine,
   a generator allocated to the at least one internal combustion engine in order to generate electrical energy, wherein the generator is mechanically coupled to the internal combustion engine such that it is driven by the internal combustion engine upon generator mode of the generator,
   a rectifier for rectifying an electrical alternating current generated by the generator,
   a direct voltage intermediate circuit, which is electrically connected to the generator via the rectifier,
   wherein
   the assembly further comprises a generator inverter, which is present in addition to the rectifier or which is the rectifier operated in the inverter mode, wherein the generator inverter connects the direct voltage intermediate circuit to the generator in order to operate the generator in a motor mode as a motor, and
   the assembly further comprises a control for controlling the motor mode of the generator,
   wherein the control has a signal input for receiving a signal which signals that no drive power is demanded from the internal combustion engine, wherein an idle speed or a range of idle speeds of the internal combustion engine is pre-specified and the control is configured, upon reception of the signal, to control the motor mode of the generator such that the internal combustion engine is driven by the generator at the pre-specified idle speed or at an idle speed in the range of pre-specified idle speeds, wherein electrical energy from the direct voltage intermediate circuit is supplied to the generator via the inverter, wherein the assembly further comprises a plurality of internal combustion engines, wherein an allocated generator is coupled to each of the internal combustion engines, which generator is driven in generator mode by the internal combustion engine in order to generate electrical energy, and which in motor mode of the generator drives the allocated internal combustion engine, wherein the assembly is configured to operate a portion of the generators in the motor mode of the generator if the assembly of several internal combustion engines is operated only in the partial load mode such that only a portion of the internal combustion engines generates mechanical energy and the other internal combustion engines are driven at idle speed by the allocated generator.

2. The assembly as in claim 1, wherein the assembly is configured upon braking the rail vehicle to operate the generators in the motor mode of the generator such that the internal combustion engines are driven at idle speed by the allocated generator.

3. The assembly as in claim 1, wherein said assembly further comprises an electrical consumer connection for supplying electrical consumers that require supplying in addition to the at least one traction motor, wherein the electrical consumer connection is connected to the direct voltage intermediate circuit such that the consumers can be supplied with electrical energy from the direct voltage intermediate circuit.

4. The assembly as in claim 1, wherein the control is configured to operate the generator or one of the generators in the motor mode when electrical energy is supplied to consumers from the direct voltage intermediate circuit and wherein the control is configured to operate at least one traction motor in a generator mode such that the energy needed from the direct voltage intermediate circuit by the consumers is at least partially fed into the direct voltage intermediate circuit by the at least one traction motor if a specified criterion is fulfilled that corresponds to an insufficient state of charge of the direct voltage intermediate circuit with any existing energy storage units connected thereto.

5. The assembly as in claim 4, wherein the control comprises or is connected to a speed regulator, wherein the speed regulator is configured to regulate the vehicle speed corresponding to a speed specification as a function of said speed specification by operating the at least one traction motor as needed in the generator or motor mode, and wherein the speed regulator is configured to permit a decrease of the travel speed according to a specified instruction in spite of a temporally constant speed specification.

6. The assembly as in claim 1, wherein the control or a separate engine control of the internal combustion engine is configured to cut off a fuel supply to fuel combustion chambers of the internal combustion engine when the internal combustion engine is driven by the generator in the motor mode of the generator.

7. The assembly as in claim 6, wherein the control or the separate engine control of the internal combustion engine is configured to resume the fuel supply to the fuel combustion chambers of the internal combustion engine if a second specified speed above the pre-specified idle speed or above the range of pre-specified idle speeds is reached.

8. A method for supplying electrical energy to traction motors in a rail vehicle, comprising the steps of:
   using at least one internal combustion engine in generator mode driving a generator allocated to the internal combustion engine, wherein the generator generates electrical energy, the generated electrical energy is rectified and fed into a direct voltage intermediate circuit from which the at least one traction motor is supplied with traction energy,
   using the generator in motor mode acquiring electrical energy from the direct voltage intermediate circuit of the generator and driving the internal combustion engine using the generator in motor mode, in the motor mode of the generator upon reception of a signal which signals that no drive power is demanded from the internal combustion engine, the generator is controlled such that the internal combustion engine is driven by the generator at a pre-specified idle speed or at an idle speed in a pre-specified range of idle speeds, wherein a plurality of internal combustion engines is operated, wherein to each of said engines is coupled an allocated generator, which is driven in generator mode by the internal combustion engine in order to generate electrical energy and which in motor mode of the generator drives the allocated internal combustion engine, wherein a portion of the generators is operated in the motor mode of the generator when the assembly of several internal combustion engines is operated only in the partial load mode such that only a portion of the internal combustion engines generates mechanical energy and the other internal combustion engines are driven at idle speed by the allocated generator.

9. The method as in claim 8, wherein upon braking the rail vehicle, the generators are operated in the motor mode of the generator such that the internal combustion engines are driven at idle speed by the allocated generator.

10. The method as in claim 8, wherein, when electrical consumers that are present in addition to the at least one traction motor are supplied with electrical energy from the direct voltage intermediate circuit via an electrical consumer connection, when the generator or generators is/are operated in the motor mode, and when a specified criterion is fulfilled that corresponds to an insufficient state of charge of the direct voltage intermediate circuit with any existing storage units connected thereto, the at least one traction motor is operated in a generator mode such that the energy from the direct voltage intermediate circuit needed by the consumers is at least partially fed into the direct voltage intermediate circuit by the at least one traction motor.

11. The method as in claim 10, wherein the vehicle travel speed is set by a speed regulator, which regulates the vehicle travel speed corresponding to a speed specification as a function of said speed specification by operating the at least one traction motor as needed in the generator or motor mode, and wherein the speed regulator is configured such that a decrease of the travel speed according to a specified instruction is permitted in spite of a temporally constant speed specification.

12. The method as in claim 8, wherein a fuel supply to fuel combustion chambers of the internal combustion engine is cut off when the internal combustion engine is driven by the generator in the motor mode of the generator.

13. The method as in claim 12, wherein the fuel supply to the fuel combustion chambers is resumed when a second pre-specified speed above the pre-specified idle speed or above the range of pre-specified idle speeds is reached.

* * * * *